US009662578B2

(12) United States Patent
Zalewski

(10) Patent No.: US 9,662,578 B2
(45) Date of Patent: May 30, 2017

(54) METHODS AND APPARATUSES FOR RECORDING AND UTILIZING AN AUDIO SIGNATURE WITHIN AN APPLICATION

(75) Inventor: Gary Zalewski, Foster City, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 1546 days.

(21) Appl. No.: 12/233,370

(22) Filed: Sep. 18, 2008

(65) Prior Publication Data

US 2009/0082100 A1 Mar. 26, 2009

Related U.S. Application Data

(60) Provisional application No. 60/994,736, filed on Sep. 21, 2007.

(51) Int. Cl.
*A63F 9/24* (2006.01)
*A63F 13/424* (2014.01)
*A63F 13/87* (2014.01)
*A63F 13/215* (2014.01)
*A63F 13/79* (2014.01)
*A63F 13/30* (2014.01)

(52) U.S. Cl.
CPC ............ *A63F 13/424* (2014.09); *A63F 13/12* (2013.01); *A63F 13/215* (2014.09); *A63F 13/79* (2014.09); *A63F 13/87* (2014.09); *A63F 2300/1081* (2013.01); *A63F 2300/5546* (2013.01); *A63F 2300/572* (2013.01); *A63F 2300/6072* (2013.01)

(58) Field of Classification Search
CPC ...... A63F 13/12; A63F 13/215; A63F 13/424; A63F 13/79; A63F 2300/1081; A63F 2300/5546; A63F 2300/572

USPC ............... 463/3, 16, 20, 35–37, 40, 29, 43; 273/138.1, 138.2, 139, 141 A, 141 R, 273/142 A, 142 B, 142 C, 142 H, 142 HA, 273/460–461; 345/475, 606; 381/61–63, 381/94.4; 725/38, 40, 133, 141, 153
IPC ........................................................ G10G 1/04
See application file for complete search history.

(56) References Cited

U.S. PATENT DOCUMENTS

| | | | | |
|---|---|---|---|---|
| 5,511,187 | A * | 4/1996 | Cragun ..................... | 704/270.1 |
| 5,860,861 | A * | 1/1999 | Lipps et al. .................... | 463/36 |
| 5,993,318 | A * | 11/1999 | Kousaki ......................... | 463/35 |
| 6,183,367 | B1 * | 2/2001 | Kaji et al. ...................... | 463/42 |
| 6,241,612 | B1 * | 6/2001 | Heredia .......................... | 463/42 |
| 6,296,570 | B1 * | 10/2001 | Miyamoto et al. ............ | 463/30 |
| 6,306,039 | B1 * | 10/2001 | Kaji et al. ...................... | 463/42 |
| 6,379,253 | B1 * | 4/2002 | Nishioka ................. | A63F 13/10 |
| | | | | 273/148 B |
| 6,544,122 | B2 * | 4/2003 | Araki et al. ................... | 463/35 |
| 6,676,523 | B1 * | 1/2004 | Kasai et al. ................... | 463/43 |
| 7,090,582 | B2 * | 8/2006 | Danieli et al. ................ | 463/35 |
| 7,208,669 | B2 * | 4/2007 | Wells et al. ................... | 84/601 |
| 7,240,093 | B1 * | 7/2007 | Danieli et al. ............... | 709/205 |
| 7,367,888 | B1 * | 5/2008 | Chen ....................... | A63F 13/12 |
| | | | | 463/1 |
| 7,389,153 | B2 * | 6/2008 | Giaimo et al. ................. | 700/94 |
| 7,613,689 | B2 * | 11/2009 | Arrouye et al. | |
| 7,630,971 | B2 * | 12/2009 | Arrouye et al. | |

(Continued)

*Primary Examiner* — Michael Cuff

(74) *Attorney, Agent, or Firm* — Martine Penilla Group, LLP

(57) ABSTRACT

In one embodiment, the methods and apparatuses detect an application, detect a participant that is utilizing the application, detect a qualifying event, and transmit an audio signature associated with the participant to a recipient wherein the recipient utilizes the application.

24 Claims, 7 Drawing Sheets

(56) References Cited

U.S. PATENT DOCUMENTS

| | | | |
|---|---|---|---|
| 7,663,045 B2* | 2/2010 | Schmidt et al. | 84/600 |
| 7,676,034 B1* | 3/2010 | Wu et al. | 379/265.01 |
| 7,682,237 B2* | 3/2010 | Ueshima et al. | 463/7 |
| 7,698,447 B2* | 4/2010 | Fujisawa et al. | 709/230 |
| 7,867,088 B2* | 1/2011 | Prum | 463/37 |
| 7,985,138 B2* | 7/2011 | Acharya et al. | 463/42 |
| 8,012,003 B2* | 9/2011 | Sterchi et al. | 463/3 |
| 8,070,607 B2* | 12/2011 | Takahashi et al. | 463/42 |
| 8,123,618 B2* | 2/2012 | Karmarkar | 463/42 |
| 8,585,507 B2* | 11/2013 | Jennings et al. | 463/42 |
| 2007/0061142 A1* | 3/2007 | Hernandez-Abrego et al. | 704/247 |
| 2007/0155494 A1* | 7/2007 | Wells et al. | 463/35 |
| 2011/0078172 A1* | 3/2011 | LaJoie et al. | 707/769 |

* cited by examiner

METHODS AND APPARATUSES FOR RECORDING AND UTILIZING AN AUDIO SIGNATURE WITHIN AN APPLICATION

CROSS-REFERENCE TO RELATED APPLICATIONS

This application claims priority to U.S. Provisional Patent Application No. 60/994,736, filed 21 Sep. 2007.

FIELD OF THE INVENTION

The present invention relates generally to an audio signatures and, more particularly, to recording and utilizing an audio signature within an application.

BACKGROUND

Interactive applications such as video games and computer games allow multiple participants to interact with each other. During these interactive applications, participants typically perform acts that are graphically shown on a display device and are audibly heard through a sound device for all other participants to see and hear, respectively.

When multiple participants participate in exchanging audible messages, it can get confusing to accurately identify the sender of the audible message. In some instances, participants can reveal their identities to other participants by audibly repeating their name during an audible communication. For example, while a participant transits an audible message to other participants, the participant may desire to remind the recipient participants of his/her identity.

Further, there are circumstances and events during the interactive applications that would be beneficial to allow participants to broadcast more customized audible messages to other participants.

SUMMARY

In one embodiment, the methods and apparatuses detect an application, detect a participant that is utilizing the application, detect a qualifying event, and transmit an audio signature associated with the participant to a recipient wherein the recipient utilizes the application.

BRIEF DESCRIPTION OF THE DRAWINGS

The accompanying drawings, which are incorporated in and constitute a part of this specification, illustrate and explain one embodiment of the methods and apparatuses for recording and utilizing an audio signature within an application. In the drawings.

DETAILED DESCRIPTION

The following detailed description of the methods and apparatuses for recording and utilizing an audio signature within an application refers to the accompanying drawings. The detailed description is not intended to limit the methods and apparatuses for recording and utilizing an audio signature within an application.

Instead, the scope of the methods and apparatuses for recording and utilizing an audio signature within an application is defined by the appended claims and equivalents. Those skilled in the art will recognize that many other implementations are possible, consistent with the methods and apparatuses for recording and utilizing an audio signature within an application.

References to "electronic device" include a device such as a personal digital video recorder, digital audio player, gaming console, a set top box, a radio, a television, a personal computer, a cellular telephone, a personal digital assistant, and the like.

References to "participant" include a representation of a player within a video game, a computer game, and the like. In one embodiment, the participant is a player that is controlled by an operator of an electronic device. In another embodiment, the participant is a player that is controlled by an electronic device.

References to "content" include audio streams, images, video streams, photographs, graphical displays, text files, software applications, electronic messages, video games including associated player data, and the like.

References to "application" include a video game, an on-line game through the internet, a computer game, and the like.

In one embodiment, an audio signature is utilized by a participant to customize communication from the participant to other participants. Although the initial communication by the participant may include both audio and non-audio communications, the audio signature is an audio representation that is chosen by the participant. In one embodiment, the audio signature is transmitted based on a qualifying event. In some instances, a participant is able to more effectively communicate with other participants by transmitting the audio signature. In one embodiment, the audio signature belonging to the participant is utilized to uniquely identify the participant among a plurality of participants while utilizing an application.

Figure 1:
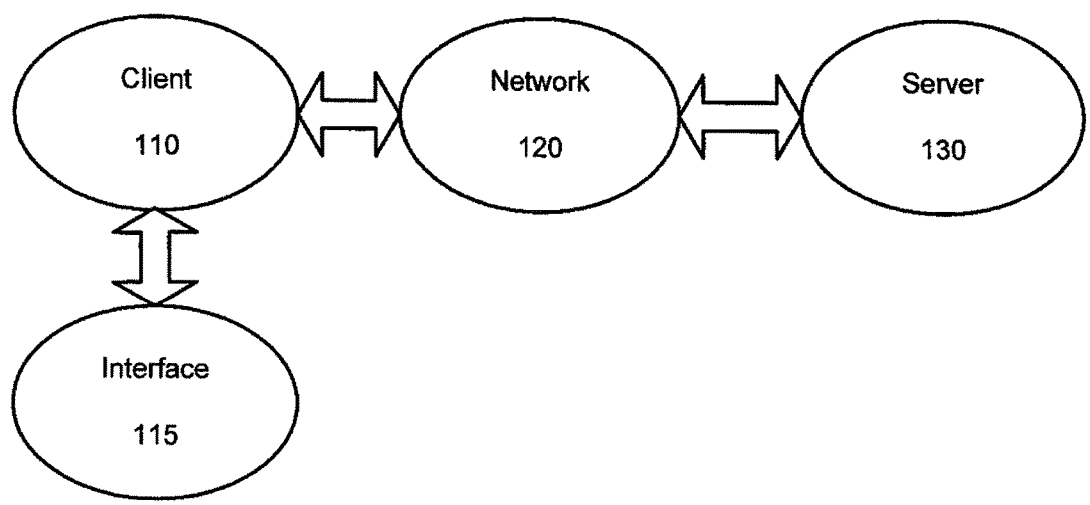
FIG. 1 is a diagram illustrating an environment within which the methods and apparatuses for recording and utilizing an audio signature within an application are implemented.

FIG. 1 is a diagram illustrating an environment within which the methods and apparatuses for recording and utilizing an audio signature within an application are implemented. The environment includes an electronic device 110 (e.g., a computing platform configured to act as a client device, such as a personal digital video recorder, digital audio player, computer, a personal digital assistant, a cellular telephone, a camera device, a set top box, a gaming console), a user interface 115, a network 120 (e.g., a local area network, a home network, the Internet), and a server 130

(e.g., a computing platform configured to act as a server). In one embodiment, the network 120 can be implemented via wireless or wired solutions.

In one embodiment, one or more user interface 115 components are made integral with the electronic device 110 (e.g., keypad and video display screen input and output interfaces in the same housing as personal digital assistant electronics (e.g., as in a Clie® manufactured by Sony Corporation). In other embodiments, one or more user interface 115 components (e.g., a keyboard, a pointing device such as a mouse and trackball, a microphone, a speaker, a display, a camera) are physically separate from, and are conventionally coupled to, electronic device 110. The user utilizes interface 115 to access and control content and applications stored in electronic device 110, server 130, or a remote storage device (not shown) coupled via network 120.

In accordance with the invention, embodiments for recording and utilizing an audio signature within an application as described below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
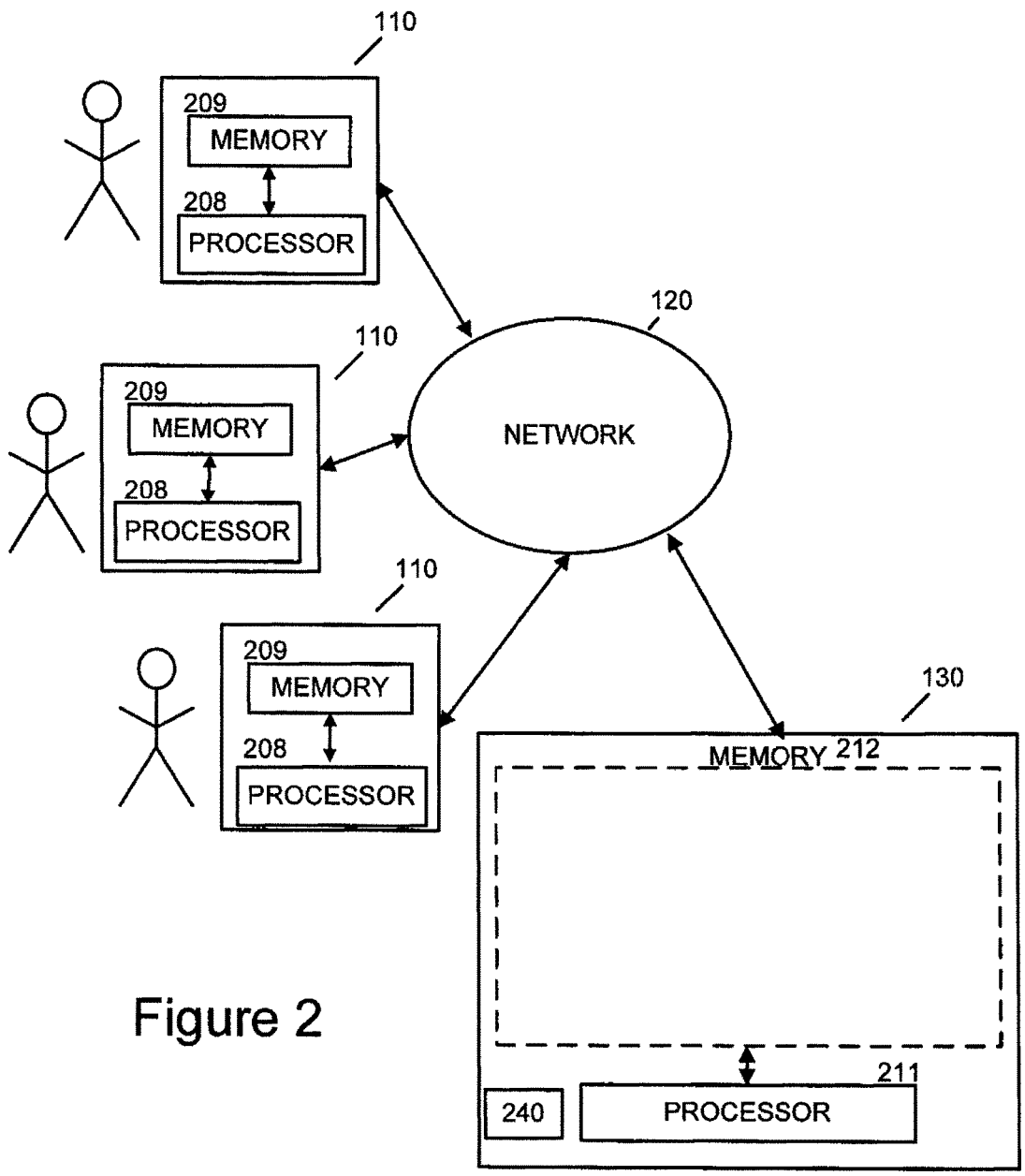
FIG. 2 is a simplified block diagram illustrating one embodiment in which the methods and apparatuses for recording and utilizing an audio signature within an application are implemented.

FIG. 2 is a simplified diagram illustrating an exemplary architecture in which the methods and apparatuses for recording and utilizing an audio signature within an application are implemented. The exemplary architecture includes a plurality of electronic devices 110, a server device 130, and a network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. A unique user operates each electronic device 110 via an interface 115 as described with reference to FIG. 1.

Server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

The plurality of client devices 110 and the server 130 include instructions for a customized application for recording and utilizing an audio signature within an application. In one embodiment, the plurality of computer-readable medium 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

One or more user applications are stored in memories 209, in memory 211, or a single user application is stored in part in one memory 209 and in part in memory 211. In one instance, a stored user application, regardless of storage location, is made customizable based on selectively communicating based on a location and event as determined using embodiments described below.

Figure 3:
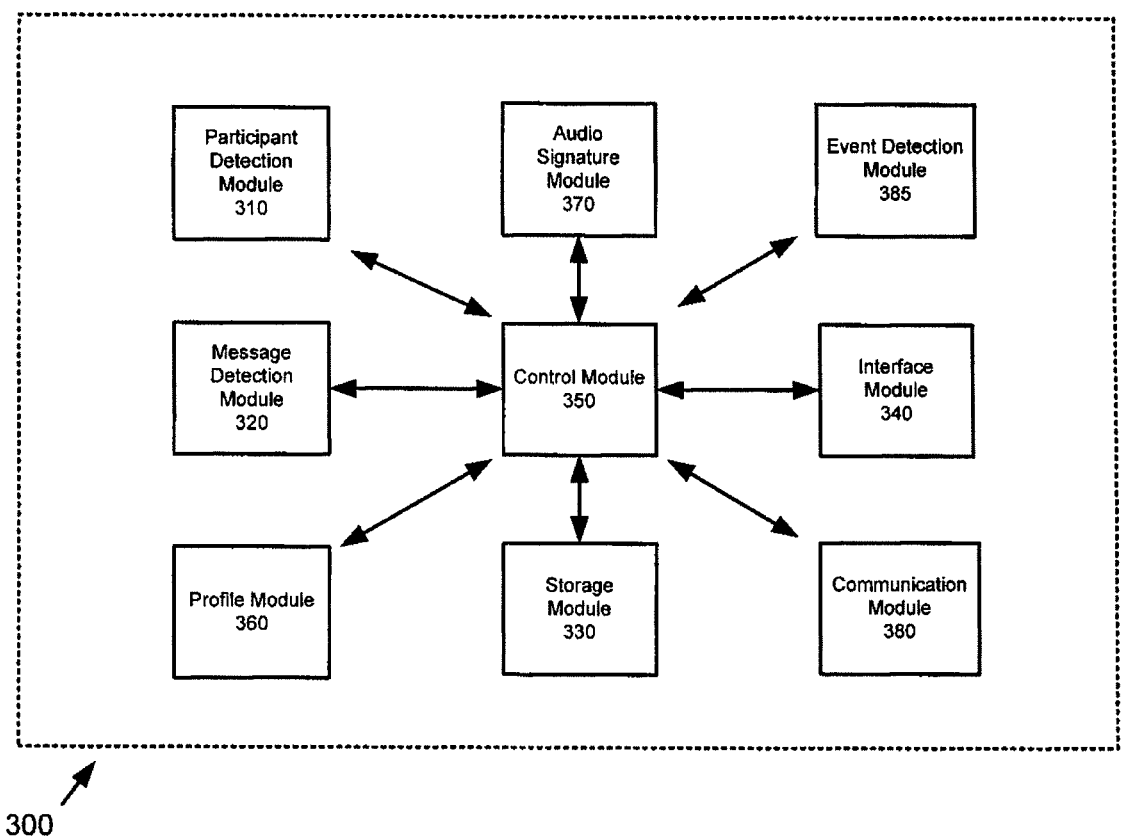
FIG. 3 is a simplified block diagram illustrating a system, consistent with one embodiment of the methods and apparatuses for recording and utilizing an audio signature within an application.

FIG. 3 illustrates one embodiment of a system 300 for recording and utilizing an audio signature within an application. The system 300 includes a participant detection module 310, a message detection module 320, a storage module 330, an interface module 340, a control module 350, a profile module 360, an audio signature module 370, a communication module 380, and an event detection module 385.

In one embodiment, the control module 350 communicates with the participant detection module 310, the message detection module 320, the storage module 330, the interface module 340, the profile module 360, the audio signature module 370, the communication module 380, and the event detection module 385.

In one embodiment, the control module 350 coordinates tasks, requests, and communications between the participant detection module 310, the message detection module 320, the storage module 330, the interface module 340, the profile module 360, the audio signature module 370, the communication module 380, and the event detection module 385.

In one embodiment, the participant detection module 310 detects participants. In one embodiment, the participants are represented by players within a video game. For example, the players within the video game may be controlled by the gaming console or may be controlled by an operator of the gaming console. In one embodiment, the participant detection module 310 simultaneously detects multiple participants. In one instance, each of the participants may be controlled by a different gaming console such that multiple gaming consoles are utilized simultaneously to control the multiple participants.

In one embodiment, the message detection module 320 detects a message from one of the participants that are detected by the participant detection module 310. In one embodiment, the message includes an audio signal. In one embodiment, the message detection module 320 also detects the length of the message. In another embodiment, the message detection module 320 also detects a frequency in the number of messages originating from a particular participant.

In one embodiment, the storage module 330 stores a plurality of profiles wherein each profile is associated with a particular application and participants and associated parameters related to the participants. In one embodiment, the profile stores exemplary information as shown in a profile illustrated in FIG. 4. In one embodiment, the storage module 330 is located within the server device 130. In another embodiment, portions of the storage module 330 are located within the electronic device 110.

In one embodiment, the interface module 340 detects the electronic device 110 as the electronic device 110 is connected to the network 120.

In another embodiment, the interface module 340 detects input from the interface device 115 such as a keyboard, a mouse, a microphone, a still camera, a video camera, and the like.

In yet another embodiment, the interface module 340 provides output to the interface device 115 such as a display, speakers, external storage devices, an external network, and the like.

In one embodiment, the profile module 360 processes profile information related to the specific content and each specific participant. In one embodiment, exemplary profile information is shown within a record illustrated in FIG. 4. In one embodiment, each profile corresponds with a particular application. For example, the application is a video game in one embodiment. In another embodiment, each profile corresponds with a particular participant.

In one embodiment, the audio signature module 370 manages the audio signature that is associated with each participant. In one embodiment, each participant has at least one unique audio signature. In one embodiment, the audio signature includes an audio signal.

In one embodiment, the communication module 380 selectively allows the audio signature to be broadcasted to other participants based on a qualifying event. For example, when a qualifying event is detected, then the participants that receive a message also receive the audio signature associated with the sender of the message.

In one embodiment, the message from one of the participants to other participants is an audio communication such as a telephone call. In another embodiment, the message from one of the participants to other participants is a video communication such as a webcam session. In another embodiment, the message from one of the participants to other participants is a textual communication such as instant messaging.

In one embodiment, the duration of the message between the participants can range from a few seconds to multiple minutes. Based on the qualifying event, the audio signature associated with the sending participant is selectively sent to the recipients of the message.

In one embodiment, the qualifying event is described within the record 400 as a profile. In one embodiment, the qualifying event includes an action by one of the participants such as requesting the audio signature be played, sending a message to recipients, communicating with other participants, discharging a pretend weapon, scoring a goal, basket, or touchdown, incapacitating another participant, making contact with another participant within the video game, and the like.

In one embodiment, the qualifying events may be limited in frequency. In one example, if the participant initiates a request to transmit the audio signature more than once every 30 seconds, requests that occur less than 30 seconds apart are disregarded. In another example, different frequencies for a qualifying event may be utilized.

In one embodiment, the event detection module 385 monitors the application and detects events that occur during the course of utilizing the application. In one embodiment, the event detection module 385 detects a qualifying event as it occurs while utilizing the application.

By limiting the frequency of the qualifying events, the frequency that the audio signature is utilized will be controlled. Further, this can prevent overuse and abuse of the audio signature by the participants.

The system 300 in FIG. 3 is shown for exemplary purposes and is merely one embodiment of the methods and apparatuses for recording and utilizing an audio signature within an application. Additional modules may be added to the system 300 without departing from the scope of the methods and apparatuses for recording and utilizing an audio signature within an application. Similarly, modules may be combined or deleted without departing from the scope of the methods and apparatuses for recording and utilizing an audio signature within an application.

Figure 4:
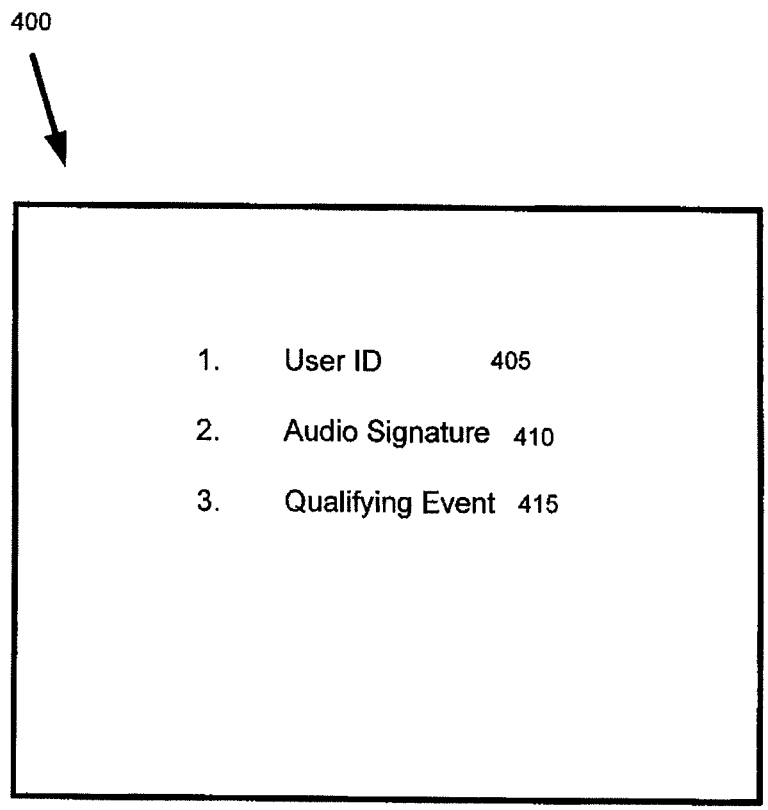
FIG. 4 illustrates an exemplary record consistent with one embodiment of the methods and apparatuses for recording and utilizing an audio signature within an application.

FIG. 4 illustrates a simplified record 400 that corresponds to a profile that describes an audio signature associated with a participant. In one embodiment, the record 400 is stored within the storage module 330 and utilized within the system 300. In one embodiment, the record 400 includes a user identification field 405, an audio signature field 410, and a qualifying event field 415.

In one embodiment, the user identification field 405 identifies a specific participant associated with the record 400. In one example, the participant's name is utilized as a label for the user identification field 405.

In one embodiment, the audio signature field 410 includes a reference to the audio signature that is associated with the participant.

In one embodiment, the qualifying event field 415 identifies various events that would trigger the broadcast of the audio signature to other participants. In one embodiment, an exemplary qualifying event includes a request by the participant in broadcasting the audio signature, communicating with other participants, success in hitting a target, scoring a goal, scoring a touchdown, capturing a target, eliminating a target, and the like.

Figure 5:
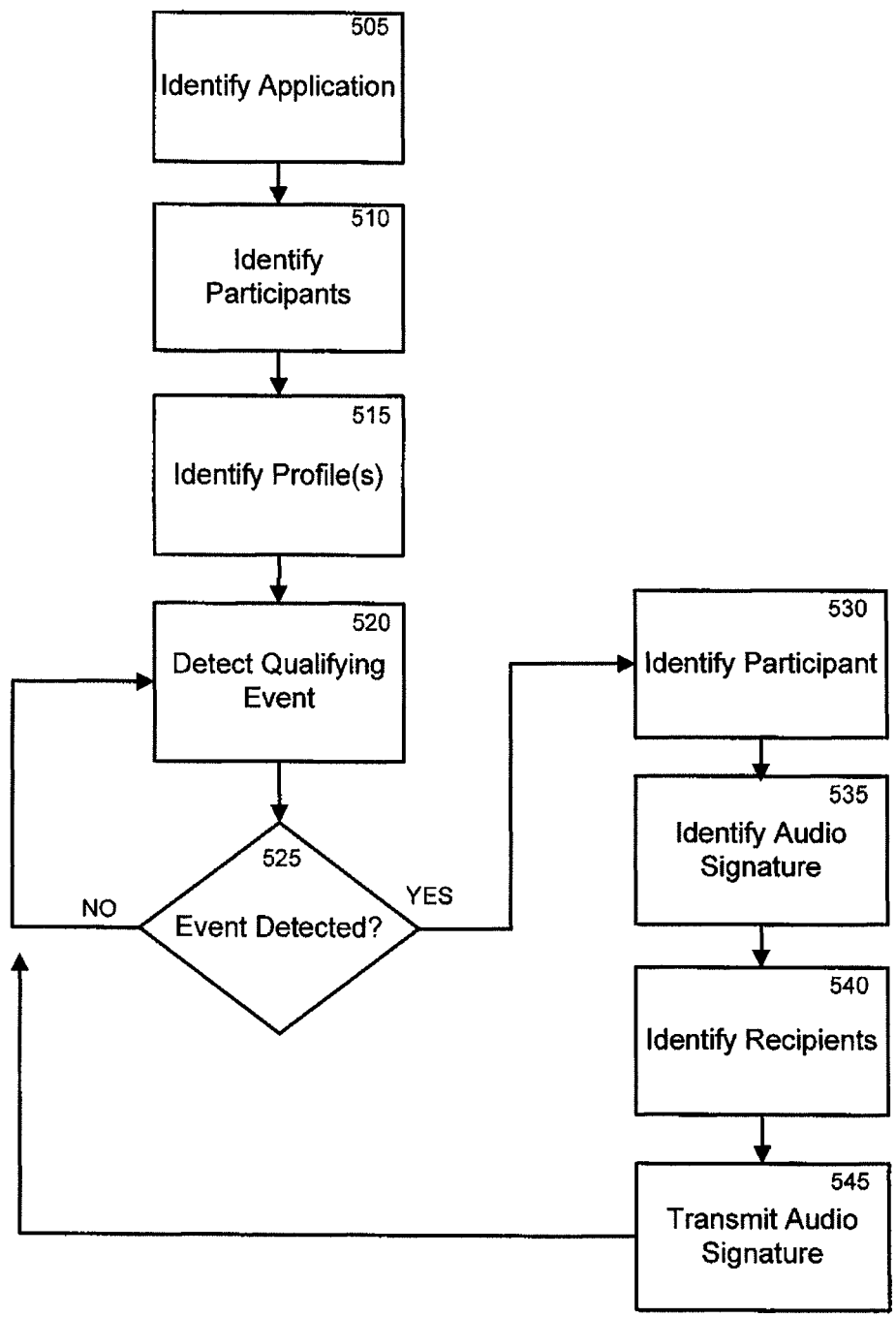
FIG. 5 is a flow diagram consistent with one embodiment of the methods and apparatuses for recording and utilizing an audio signature within an application.
Figure 6:
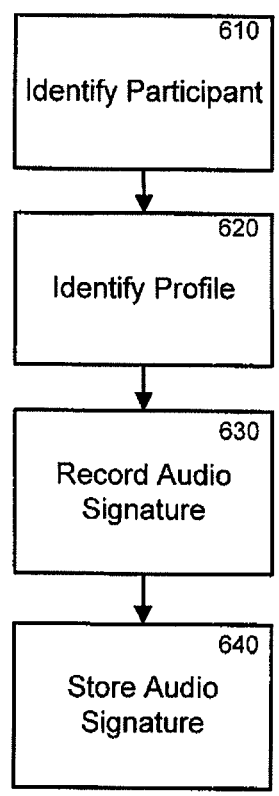
FIG. 6 is a flow diagram consistent with one embodiment of the methods and apparatuses for recording and utilizing an audio signature within an application.
Figure 7:
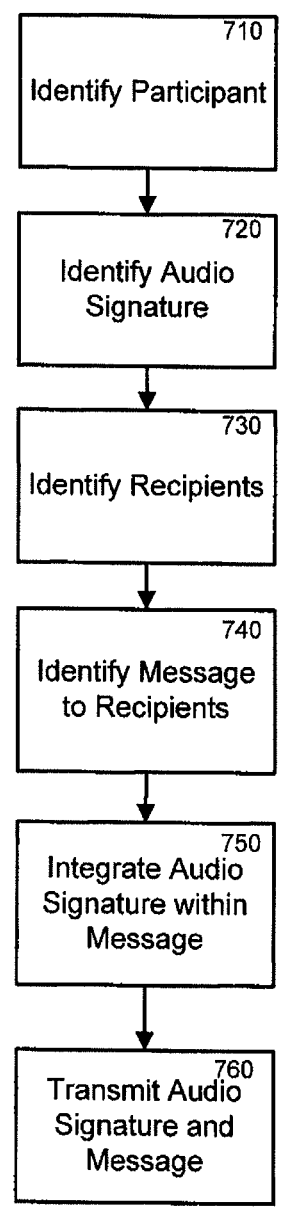
FIG. 7 is a flow diagram consistent with one embodiment of the methods and apparatuses for recording and utilizing an audio signature within an application.

The flow diagrams as depicted in FIGS. 5, 6, and 7 are one embodiment of the methods and apparatuses for recording and utilizing an audio signature within an application. The blocks within the flow diagrams can be performed in a different sequence without departing from the spirit of the methods and apparatuses for recording and utilizing an audio signature within an application. Further, blocks can be deleted, added, or combined without departing from the spirit of the methods and apparatuses for recording and utilizing an audio signature within an application.

The flow diagram in FIG. 5 illustrates selectively transmitting the audio signature to other participants according to one embodiment of the invention.

In Block 505, the application is identified. In one embodiment, specific application such as a specific video game is detected and identified. In one embodiment, the specific video game may be selected from a plurality of content. Further, the plurality of applications may include multiple types of content such as video games, computer games, and interactive content, and the like. In one embodiment, the plurality of content is stored within the storage module 330.

In Block 510, participants are identified. In one embodiment, the participants are utilizing the application as identified within the Block 505. In one embodiment, each participant is located in a remote location relative to each participant.

In Block 515, a profile corresponding with each of the identified participants within the Block 510 is identified. An exemplary profile is illustrated as record 400 within FIG. 4. In one embodiment, some participants may not have a corresponding profile. In the event that a corresponding profile that is unique to the identification application is not found or identified, a general profile may be identified as a substitute in one embodiment.

In Block 520, a qualifying event is detected. In one embodiment, a qualifying event is listed within a profile identified within the Block 515. In one embodiment, the events occurring within the application are monitored. In one embodiment, the events that are monitored are initiated by one of the participants. In another embodiment, the events that are monitored are initiated by the application.

In Block 525, a determination is made on whether a qualifying event is detected.

If there is no qualifying event detected, then additional detection is performed within the Block 520.

If there is a qualifying event detected, then a participant is identified detected within Block 530. In one embodiment, the participant that is identified is associated with the qualifying event. For example, having the detected participant initiate a request to transmit the audio signature is a qualifying event.

In another example, having the detected participant initiate a message with another participant is a qualifying event. In yet another example, having the detected participant receive a message initiated by another participant is a qualifying event. In yet another example, having the detected participant score a goal, accomplish a task, and the like is a qualifying event.

In one embodiment, the qualifying events may be limited in frequency. For example, if a participant performs an act that would be usually deemed a qualifying event, a limit of how many qualifying events per period of time may be imposed. In one embodiment, a qualifying event may occur only once every 30 seconds. In this embodiment, if the participant initiates a request to transmit the audio signature more than once every 30 seconds, requests that occur less than 30 seconds apart are disregarded.

In Block 535, an audio signature is identified. In one embodiment, the identified audio signature corresponds with the profile associated with the participant identified within the Block 530. In one embodiment, the audio signature is customized by the identified participant.

In Block 540, participants are identified to receive the audio signature. In one embodiment, a participant is identified based on the qualifying event. For example, if scoring a goal in a game is a qualifying event and the goal is scored by a participant, then this participant that scored the goal is identified. In a similar example, a participant that assists in scoring the goal may also be identified.

In another embodiment, every participant within the vicinity of the qualifying event is also identified. For example, if scoring a goal in a game is a qualifying event, then all participants within the area of the goal being scored are identified.

In another embodiment, every participant that is in communication with the identified participant is also identified. For example, every participant that receives a message from the identified participant is also identified.

In yet another embodiment, every participant within the application during a qualifying event is also identified. For example, if scoring a goal in a game is a qualifying event, then all participants within the application when the goal is scored are identified.

Based on the identified participant, other participants that are within a predetermined distance of the identified participant are considered to be within a group with the identified participant.

In Block 545, the audio signature identified within the Block 535 is transmitted to the recipients identified within the Block 530. In one embodiment, the audio signature is transmitted through an audio communication channel such as voice call. In yet another embodiment, the audio signature is transmitted through a video communication channel such as a webcam session.

In one example, the application may be a soccer game utilizing a video game console. In this example, there are two teams. As two competing participants on different teams are near each other, one of these participants scores a goal against the other participant's team. In one embodiment, both these participants would not ordinarily communicate with each other. However, in one embodiment, scoring the goal is a qualifying event and both participants are within the predetermined distance from each other. In one embodiment, the participant scoring the goal is the identified participant. Accordingly, the identified participant transmits the audio signature to the other participant.

The preceding example illustrates one embodiment. Another embodiment includes an action/adventure game having multiple teams where the qualifying event may be striking a participant on the opposite team. Further, in other embodiments, different variations of games may be included with variations in the qualifying events.

In another embodiment, the identified participant submits a request to distribute the participant's audio signature to other participants. In one example, the request to distribute the audio signature by the identified participant is the qualifying event. In another example, the request to distribute the audio signature along with another attribute such as the frequency of the request is utilized to determine whether the qualifying event is satisfied.

In another embodiment, the identified participant transmits a message to a recipient. Based on the length of the message, transmitting the message is a qualifying event in one embodiment. In one example, if the identified recipient transmits a message lasting longer than 5 seconds, transmitting this message serves as a qualifying event. Further, the audio signature can be automatically transmitted with the message to the recipient in one embodiment. In another example, multiple audio signatures may be inserted within each message such as at the beginning and end of the message or at multiple times during the message.

The flow diagram in FIG. 6 illustrates recording an audio signature according to one embodiment of the invention.

In Block 610, a participant is identified.

In Block 620, a profile corresponding with the identified participant within the Block 610 is identified. An exemplary profile is illustrated as record 400 within FIG. 4.

In Block 630, an audio signature for the identified participant is recorded. In one embodiment, the audio signature includes information that represents an audio signal. In one embodiment, the audio signal is formed by the participant through an audio capture device such as a microphone or through an audio generation device such as an electronic keyboard.

In Block 640, the audio signature is stored. In one embodiment, the audio signature is stored within the exemplary profile as illustrated as record 400 within FIG. 4.

The flow diagram in FIG. 7 illustrates selectively transmitting the audio signature to other participants according to one embodiment of the invention.

In Block 710, a participant is identified.

In Block 720, an audio signature is identified that corresponds with the participant identified within the Block 710. In one embodiment, the identified audio signature corresponds with the profile associated with the participant identified within the Block 710. In one embodiment, the audio signature is customized by the identified participant.

In Block 730, participants are identified to receive the audio signature. In one embodiment, a participant is identified based on the qualifying event. For example, if scoring a goal in a game is a qualifying event and the goal is scored by a participant, then this participant that scored the goal is identified. In a similar example, a participant that assists in scoring the goal may also be identified.

In another embodiment, every participant within the vicinity of the qualifying event is also identified. For example, if scoring a goal in a game is a qualifying event, then all participants within the area of the goal being scored are identified.

In another embodiment, every participant that is in communication with the identified participant is also identified. For example, every participant that receives a message from the identified participant is also identified.

In yet another embodiment, every participant within the application during a qualifying event is also identified. For example, if scoring a goal in a game is a qualifying event, then all participants within the application when the goal is scored are identified.

Based on the identified participant, other participants that are within a predetermined distance of the identified participant are considered to be within a group with the identified participant.

In Block 740, a message is identified as being sent by the identified participant to the recipient. In one embodiment, the message is an audio message. In another embodiment, the message is a video message with an audio component.

In Block 750, the audio signature is integrated with the message. In one embodiment, the audio signature precedes the message. In another embodiment, the audio signature follows the message. In yet another embodiment, the audio signature is inserted within the message. In yet another embodiment, multiple instances of the audio signature are inserted within the message.

In Block 740, the audio signature and the message are transmitted to the recipients identified within the Block 730. In one embodiment, the audio signature and message are transmitted through an audio communication channel such as voice call. In yet another embodiment, the audio signature and the message are transmitted through a video communication channel such as a webcam session.

The foregoing descriptions of specific embodiments of the invention have been presented for purposes of illustration and description. For example, the invention is described within the context of for recording and utilizing an audio signature within an application as merely one embodiment of the invention. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method for controlling communication between gaming devices, by a server, during gaming sessions, comprising:
   detecting, by the server, execution of a game application for a gaming session;
   detecting, by the server, utilization of the game application by a plurality of participants, each participant having a profile and using a device that communicates with the server during the gaming session;
   receiving, at the server, an input from a device of a participant during utilization of the game application, the input causing an action within the game application;
   detecting, by the server, that the action within the game application is associated with a qualifying event, the qualifying event being associated with a profile of the participant;
   identifying, by the server, a recipient from the plurality of participants based on the qualifying event; and
   transmitting, by the server, an audio signature associated with the profile of the participant to a device of the recipient automatically in response to the detecting that the action within the game is associated with the qualifying event by the server, the audio signature configured to be played by the device of the recipient, the method being executed by a processor.

2. The method according to claim 1 wherein the game application is one of a video game, a computer game, or an interactive game.

3. The method according to claim 1 further comprising monitoring the game application, by the server using an event detection module, for the qualifying event.

4. The method according to claim 1 wherein the participant represents a character within the game application.

5. The method according to claim 1 further comprising matching a profile with the participant.

6. The method according to claim 5 wherein the profile further includes a reference to the audio signature.

7. The method according to claim 5 wherein the profile further includes a predetermined qualifying event such that when the qualifying event matches the predetermined qualifying event, the audio signature is transmitted to the recipient.

8. The method according to claim 1 wherein the action caused by the game application in response to input by the device of one of the participants that represents the qualifying event is rendered by the game application as one of scoring a goal, hitting a target, falling down, firing a fictional weapon, sending a message, requesting transmission of the audio signature, an action by one of the participants such as requesting the audio signature be played, communicating with other participants, discharging a pretend weapon, scoring a basket, scoring a touchdown, incapacitating another participant, or making contact with another participant within the video game.

9. The method according to claim 1 further comprising transmitting a message from the participant to the recipient along with the audio signature.

10. The method according to claim 9 wherein the message includes one of an audio communication, a video communication, a textual communication, or a graphical communication.

11. The method according to claim 1 further comprising integrating the audio signature with a message.

12. The method according to claim 11 where integrating further comprises inserting the audio signature within the message.

13. The method according to claim 11 where integrating further comprises inserting the audio signature before the message.

14. The method according to claim 11 where integrating further comprises inserting the audio signature after the message.

15. The method according to claim 1, wherein the server further includes an event detection module, an audio detection module, or a storage module.

16. A method for controlling communication between gaming devices, by a server, during gaming sessions, comprising:
   detecting, by the server, execution of a game application for a gaming session;
   detecting, by the server, utilization of the game application by a plurality of participants, each participant having a profile and using a device that communicates with the server during the gaming session;
   receiving, at the server, an input from a device of a participant during utilization of the game application, the input causing an action within the game application;
   detecting, by the server, that the action within the game application is associated with a qualifying event, the qualifying event being associated with a profile of the participant;

identifying, by the server, a recipient from the plurality of participants based on the qualifying event, wherein each of the plurality of participants have a representative character being controlled in the game application during the gaming session, wherein the action produced by the application that is detected to be the qualifying event is related to an area within the game application, such that a representative character of one of the plurality of participants that is within a predetermined distance to the area is identified to be the recipient; and transmitting, by the server, an audio signature associated with the profile of the participant to a device of the recipient automatically in response to the detecting that the action within the game is associated with the qualifying event by the server, the method being executed by a processor.

17. The method according to claim 16, wherein the action caused by the game application in response to the input by the device of one of the participants that represents the qualifying event is rendered in the game application by one of, scoring a goal, hitting a target, falling down, firing a fictional weapon, sending a message, requesting transmission of the audio signature, an action by one of the participants such as requesting the audio signature be played, communicating with other participants, discharging a pretend weapon, scoring a basket, scoring a touchdown, incapacitating another participant, or making contact with another participant within the game application.

18. The method according to claim 16, wherein the game application is one of a video game, a computer game, or an interactive game.

19. The method according to claim 16, further comprising monitoring the game application, by the server using an event detection module, for the qualifying event.

20. The method according to claim 16, further comprising integrating the audio signature with a message.

21. The method according to claim 20, where integrating further comprises inserting the audio signature within the message.

22. The method according to claim 20, where integrating further comprises inserting the audio signature before the message.

23. The method according to claim 20, where integrating further comprises inserting the audio signature after the message.

24. The method according to claim 16, wherein the server further includes an event detection module, an audio detection module, or a storage module.

* * * * *